United States Patent
Chae et al.

(10) Patent No.: US 9,726,217 B2
(45) Date of Patent: Aug. 8, 2017

(54) CONNECTING ROD CRACKING MANDREL

(71) Applicant: Mahle International GmbH, Stuttgart (DE)

(72) Inventors: Jeungsuck Chae, West Bloomfield, MI (US); Aldo Molina, Saltillo (MX); Leonardo Saucedo, Ramos Arizpe (MX); Santiago Quinones, Saltillo (MX)

(73) Assignee: Mahle International GmbH (DE)

( * ) Notice: Subject to any disclaimer, the term of this patent is extended or adjusted under 35 U.S.C. 154(b) by 110 days.

(21) Appl. No.: 14/492,742

(22) Filed: Sep. 22, 2014

(65) Prior Publication Data
US 2016/0084296 A1    Mar. 24, 2016

(51) Int. Cl.
*F16C 9/04* (2006.01)
*B26F 3/00* (2006.01)
*B23D 31/00* (2006.01)

(52) U.S. Cl.
CPC ............ *F16C 9/045* (2013.01); *B23D 31/003* (2013.01); *B26F 3/002* (2013.01)

(58) Field of Classification Search
CPC ........ F16C 9/045; B26F 3/002; B23D 31/003; Y10T 29/49288; Y10T 225/371; Y10T 29/4979; Y10T 225/12; Y10T 225/325; Y10T 225/379
See application file for complete search history.

(56) References Cited

U.S. PATENT DOCUMENTS

| | | | | |
|---|---|---|---|---|
| 5,274,919 A * | 1/1994 | Becker | ................. | B23D 31/003 29/888.09 |
| 6,125,536 A * | 10/2000 | Spurny | ................... | F16C 9/045 29/413 |
| 6,474,526 B1 * | 11/2002 | Hahnel | ................ | B23D 31/003 225/100 |
| 6,782,609 B1 * | 8/2004 | Beggs | ................. | B23D 31/003 225/100 |
| 2006/0231164 A1 * | 10/2006 | Ishida | ................. | B23D 31/003 148/206 |

* cited by examiner

*Primary Examiner* — Jonathan Riley
(74) *Attorney, Agent, or Firm* — Fishman Stewart PLLC

(57) ABSTRACT

Exemplary connecting rod cracking mandrels and methods are disclosed. A mandrel may include a pair of jaw elements slidably mounted relative to one another and separated from each other. Each one of the jaw elements has a pair of opposing side portions and a center portion disposed between the opposing side portions. Each one of the side portions is configured to contact an inner diameter surface of a bore of a connecting rod when the jaws are moved away from one another within the bore so as to break the connecting rod. The center portion is configured to be spaced apart from the inner diameter surface of the bore when the jaws are moved away from one another within the bore, such that the opposing side portions contact the connecting rod bore.

11 Claims, 3 Drawing Sheets

CONNECTING ROD CRACKING MANDREL

BACKGROUND

The connecting rod in an internal combustion engine connects the crankshaft to a piston. The connecting rod has one end including a bore that is configured to attach to the wrist pin a piston, and the connecting rod has an opposing larger end including a bore that is configured to attach to the eccentric pin on a crankshaft. This larger end typically includes a separate bearing cap that in part defines the bore and can be attached to the remaining portion of the connecting rod, so as to mount the pin of the crankshaft within the bore. In the past, the normal practice was to initially mold and machine the connecting rod in two pieces that would then be bolted together on the crankshaft pin.

More recent manufacturing processes separate a bearing cap from a one-piece rod, e.g., by cracking or fracturing the rod. This method typically utilizes an expansion mandrel that applies tension force of relatively great magnitude within the bore and along the longitudinal axis of the connecting rod, thus causing the rod to completely fracture and form the connecting rod and the separate bearing cap. More specifically, the mandrel can include a pair of opposing semi-circular protrusions received within a circular bore formed in the end of the rod. The semi-circular protrusions can be nested against the inner diameter surface of the bore and apply the longitudinal force to separate the bearing cap from rest of the connecting rod. However, known mandrel protrusions apply the load specifically to centrally disposed portions of the inner diameter surface that are disposed along the longitudinal axis of the rod, which can cause the opposing sides of the bearing cap adjacent the fracture to be deformed in a somewhat radially inward direction. Thus, when the connecting rod is assembled and mounted to the crankshaft pin after the cracking process is completed, the bore may be non-circular as a result of the side portions being displaced somewhat radially inward. These sides may bear a larger portion of the load than the remaining portions of the bearing cap and the connecting rod.

Accordingly, there is a need for a method and apparatus configured to crack a connecting rod while maintaining a circular bore shape in the connecting rod.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of a mandrel configured to crack a connecting rod and a process for using the mandrel to crack the connecting rod, so as to reduce radially inward deformation of the connecting rod and produce a bearing cap that maintains a circular bore of the connecting rod that is configured to mount an eccentric pin of a crankshaft therein. In particular, the mandrel can have a center portion configured to be disposed along a longitudinal axis of the connecting rod and remain spaced apart from the connecting rod, such that side portions of the mandrel adjacent to the center portion can apply sufficient longitudinal force to separate the bearing cap from the connecting rod while further applying sufficient laterally outward force to reduce radially inward deformation of the bearing cap and connecting rod at the point where the bearing cap separates from the remaining portion of the connecting rod.

Figure 1:
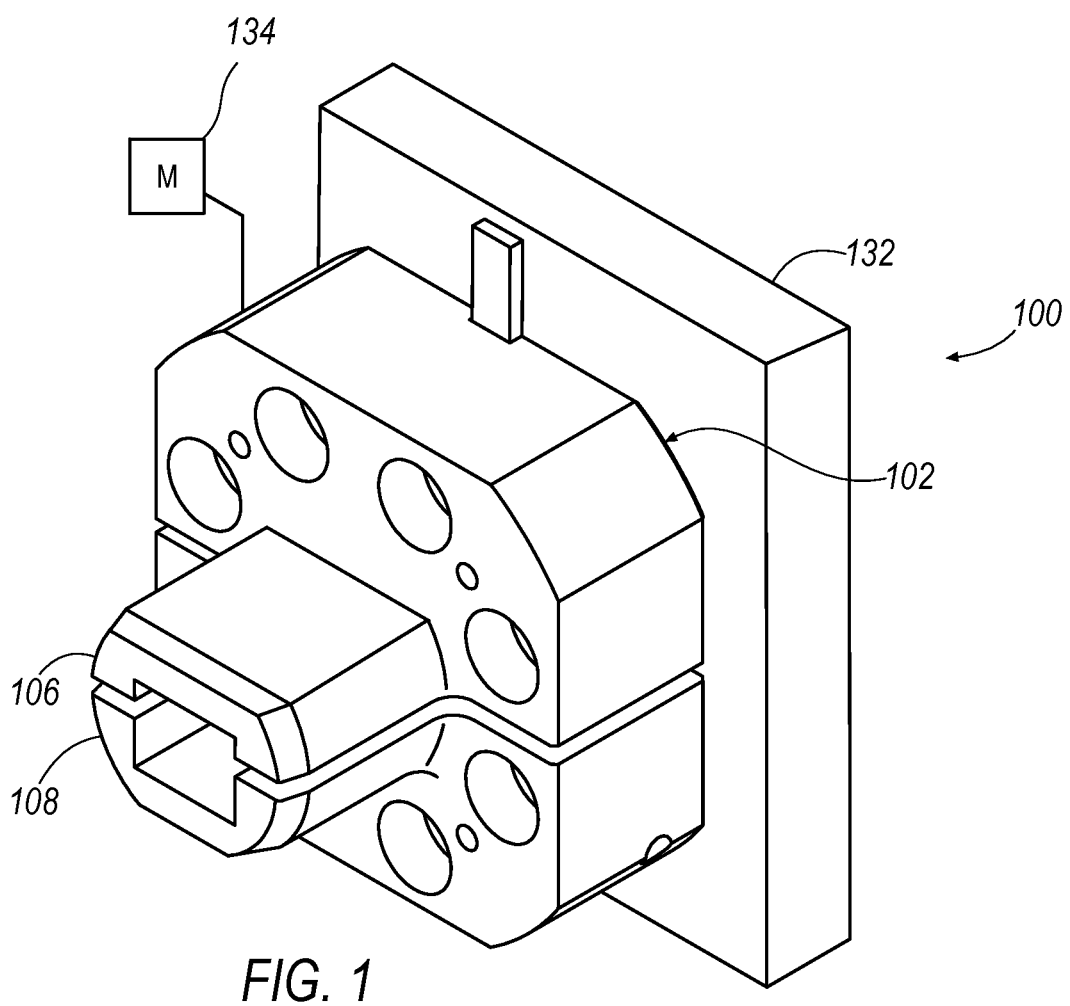
FIG. 1 is a perspective view of an exemplary mandrel configured to crack a connecting rod to produce a bearing cap and connecting rod that form a circular bore.
Figure 2:
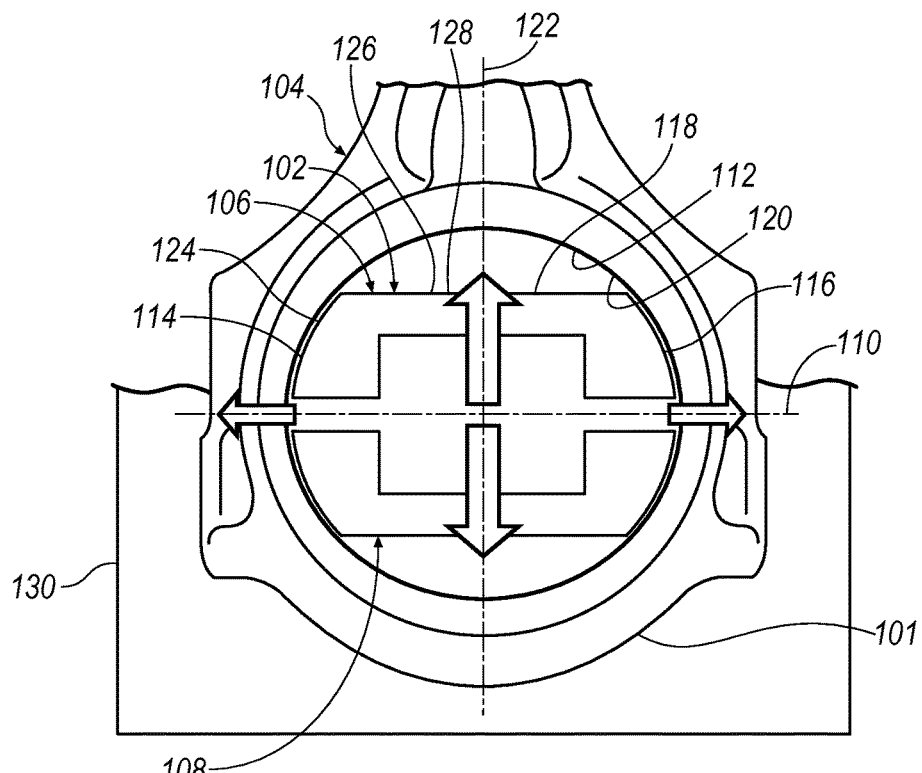
FIG. 2 is an end view of the exemplary mandrel shown in FIG. 1, received within a bore of a connecting rod and distributing a longitudinal force to the same to fracture the connecting rod while reducing radially inward deformation of its opposing lateral sides.

Turning now to FIGS. 1 and 2, an exemplary system 100 for cracking a connecting rod is illustrated. In particular, FIG. 1 illustrates schematic representation of the system 100 including a perspective view of mandrel 102. FIG. 2 illustrates an enlarged end view of the mandrel 102 cracking the end of a connecting rod 104. The mandrel 102 may have a pair of jaw elements 106, 108 slidably mounted relative to one another and separated from each other along a bisecting plane 110, which extends through a central axis (not shown) of a bore 112 of the connecting rod 104. As best shown in FIG. 2, each one of the jaw elements 106, 108 can have a pair of opposing side portions 114, 116 and a center portion 118 disposed between the opposing side portions 114, 116. Further, each one of the side portions 114, 116 may be configured to contact an inner diameter surface 120 of the bore 112 of the connecting rod 104 when the jaw elements 106, 108 are moved along a longitudinal axis 122 of the connecting rod and away from one another within the bore 112, so as to break the connecting rod 104. The center portion 118 is configured to be spaced apart from the inner diameter surface 120 of the bore 112 when the jaws 106, 108 are moved away from one another within the bore 112 thereby reducing deformation of the connecting rod 104 in a radially inward direction.

As best shown in FIG. 2, each jaw element 106, 108 can have a semi-circular outer surface 124, and the center portion 118 of each jaw element may have planar outer surface 126 extending between the opposing side portions 114, 116, thus forming a recess 128 in the semi-circular outer surface 124. In this example, the planar outer surface 126 forms a recess 128 that extends approximately 90 degrees about the semi-circular outer surface 124. However, the center portion that is spaced apart from the connecting rod 104 can extend more or less than 90 degrees about the semi-circular outer surface 124. In the present example, the planar outer surface 126 may be disposed parallel or substantially so with respect to the bisecting plane 110, and/or perpendicular or substantially so with respect to the longitudinal axis 122 of the connecting rod 104. The planar outer surface 126 and underlying structure may be configured to support the side portions 114, 116 of the mandrel 102, which in turn urge the inner diameter surface 120 of the bore 112 laterally outward during the cracking process. Accordingly, radially inward deformation of the connecting rod, and in particular the inner surface of the bore 112, may be minimized if not entirely eliminated, thereby maintaining a circular bore 112 for the connecting rod 104. Moreover, these side portions 114, 116 apply sufficient force along a longitudinal direction of the connecting rod 104 to separate the bearing cap 101 from remaining portion of the connecting rod 104, e.g., along the bisecting plane 110.

The system 100 may further include a fixture device 130 (FIG. 2) configured to hold the connecting rod 104 when the mandrel 102 breaks the connecting rod. Moreover, the system 100 may further include a frame 132 (FIG. 1), which carries the jaw elements 106, 108. As one example, the jaw elements 106 may be fixedly attached to the frame 132, and the jaw element 108 may be slidably attached to a rail formed on the frame 132. However, the jaw element 108 may be slidably attached to the frame 132 by a tongue in groove attachment. As still another example, both jaw elements 106, 108 may be slidably attached to the frame 132.

Referring again to FIG. 1, the system 100 may further include a motor 134 configured to move at least one of the jaw elements 106, 108 to spread them apart from one another, along the longitudinal axis 122 of the connecting rod 104.

Figure 3:
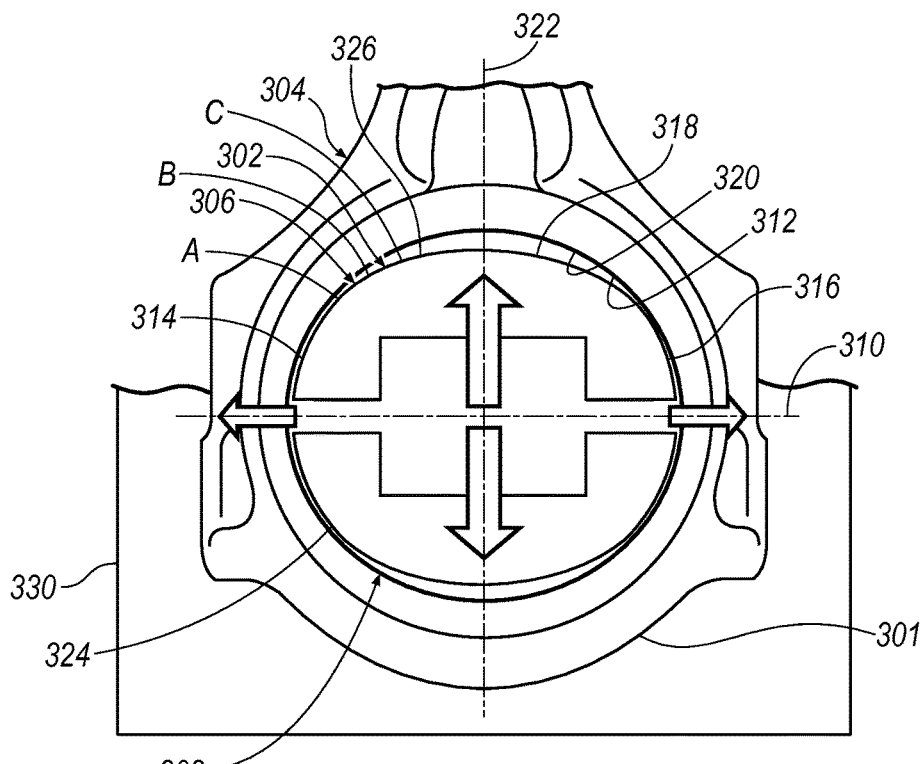
FIG. 3 is an end view of another exemplary mandrel, received within a bore of a connecting rod and applying a longitudinal force to the same.

Turning now to FIG. 3, another exemplary mandrel 300 is illustrated. The mandrel 300 may be similar to the mandrel 100 illustrated in FIGS. 1 and 2, and thus the mandrel has corresponding components identified by reference numerals in the 300 series. As with mandrel 100 of FIGS. 1 and 2, the mandrel 300 may have two jaw elements 306, 308. However, the mandrel 300 may include a convex outer surface 324 with multiple radii of curvature. In particular, the side portions 314, 316 may have radii of curvature that are equal to a radius of the inner diameter surface 320 of the bore 312. In particular, as compared to the mandrel 102 of FIGS. 1 and 2, the mandrel 302 may have a center portion 318 that does not have a planar surface but rather the center portion 318 can have a convex outer surface 326, which extends between the side portions 314, 316. This center portion 318 can have a radius of curvature that is greater than the radius of curvature of each one of the side portions 314, 316. The center portion 318 of the mandrel 302 may be spaced apart from the inner surface of the bore 312 when the side portions 314, 316 are brought into contact with the bore 312. This configuration of the convex outer surface 324 with its multiple radii of curvature permits a progressively larger portion of the mandrel 302 to contact the inner diameter surface 320 of the bore 312 as the jaw elements 306, 308 are moved farther apart from each other. For instance, when the jaw elements 306, 308 make first contact with the bore 312 of the connecting rod 304, the convex outer surface 326 may be in contact with the inner surface of the bore 312 from the bisecting plane 310 to reference point A. Further, as load applied by the mandrel 302 to the bore 312 is increased, a progressively larger portion of the convex outer surface 326 may come into contact with the inner diameter surface 324 of the bore 312. In particular, the convex outer surface 326 may contact the inner diameter surface 324 of the bore 312 from the bisecting plane 310 to reference point B. Moreover, after further deformation e.g., at the time when the connecting rod may fracture as a result of the load applied by the mandrel 302, the convex outer surface 326 may be in contact with the inner diameter surface 324 of the bore 312 from the bisecting plane 310 to reference point C. In other words, as load applied by the mandrel 302 increases, deformation of the bore 312 and/or the mandrel 302 also may increase, thereby bringing a progressively larger surface area of the mandrel 302 into direct contact with the bore 312. This configuration may gradually distribute the load across a larger portion of the connecting rod bore, while maintaining contact between the side portions of the mandrel and the connecting rod bore. Moreover, a center portion of the bore 312, e.g., including the longitudinal axis 322 of the connecting rod 304, remains out of contact with the mandrel 302 while load is applied, thereby reducing radially inward deformation of the bore 312 as described above.

Figure 4:
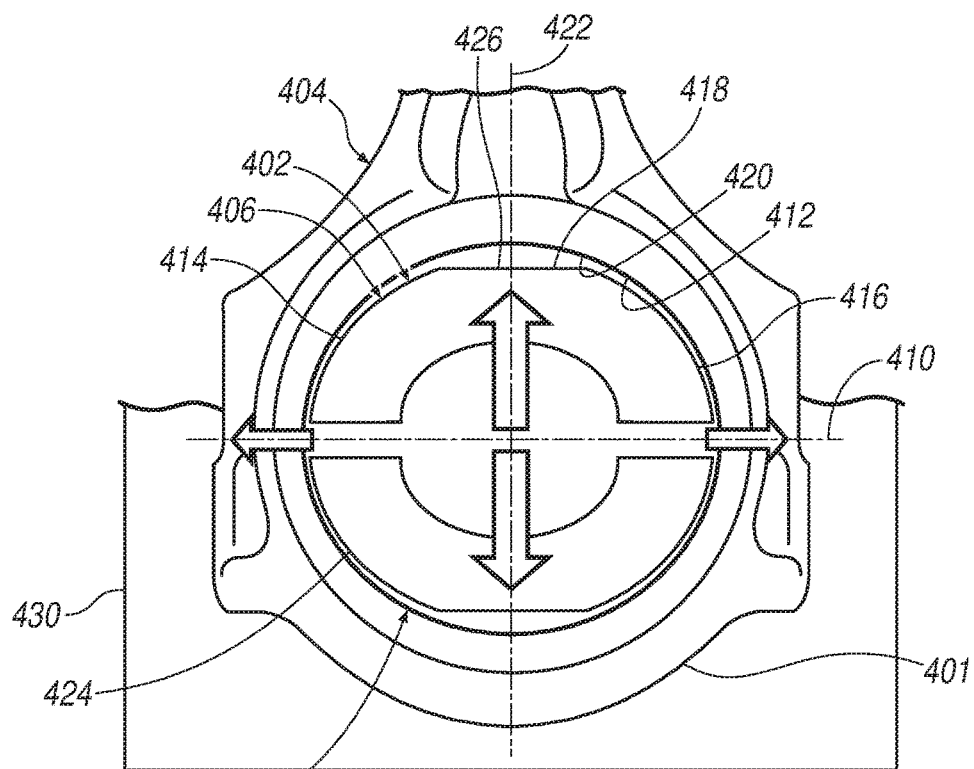
FIG. 4 is an end view of still another exemplary mandrel, received within a bore of a connecting rod and applying a longitudinal force to the same.

Turning now to FIG. 4, still another exemplary mandrel 402 is illustrated. The mandrel 402 is similar to the mandrel 102 shown in FIGS. 1 and 2, and thus the mandrel 402 includes similar components as identified by corresponding reference numerals in the 400 series. In particular, this mandrel 402 may have a planar outer surface 426, which is somewhat similar to the mandrel 102 of FIGS. 1 and 2 having the planar outer surface 126. However, the planar outer surface 426 extends less than 90 degrees about the outer semicircular surface. The center portion can extend more or less than 90 degrees about the outer semicircular surface. Moreover, the center portion can be convex, concave, or have multiple contours for remaining spaced apart from the connecting rod and/or progressively abutting the inner diameter surface as the mandrel 402 cracks the connecting rod 404.

Figure 5:
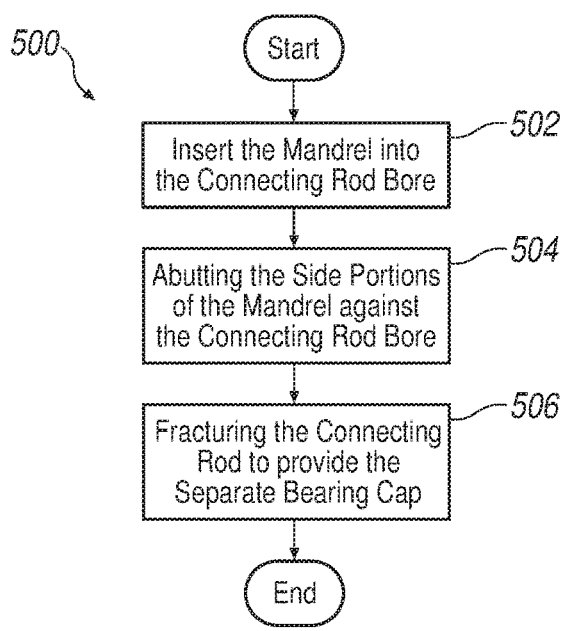
FIG. 5 is a flow chart for operating the mandrel of FIGS. 1 and 2 to break the connecting rod.

Turning now to FIG. 5, a process 500 for operating the mandrel 102 of FIGS. 1 and 2 to break the connecting rod 104 is illustrated. At block 502, the mandrel 102 and its jaw elements 106, 108 are inserted into the bore 112 of the connecting rod 104.

Proceeding to block 504, the process 500 may include abutting the side portions 114, 116 of at least one of the jaw elements 106, 108 against the inner diameter surface 120 of the bore 112. This step can be accomplished by actuating the motor 134 to move the jaw elements 106, 108 apart from each other along the longitudinal axis 122 of the connecting rod 104. In particular, the jaw elements 106, 108 may be separated from one another, thereby forcing the side portions 114, 116 against the inner diameter surface 120 of the bore 112 to apply a laterally outward force that prevents radially inward deformation of the bearing cap and connecting rod 104. Moreover, the jaw elements 106, 108 also apply a longitudinal force that fractures the connecting rod 104 by separating the bearing cap from the remaining portion of the connecting rod 104.

Block 504 may be accomplished by progressively abutting a larger portion of the mandrel 302 against the inner diameter surface 320 of the bore 312 as the jaw elements 306, 308 are moved farther apart from each other, e.g., as described above regarding the exemplary mandrel 302 illustrated in FIG. 3. In particular, when the jaw elements 306, 308 make first contact with the connecting rod 304, the convex outer surface 326 may contact the inner diameter surface of the bore 312 from the bisecting plane 310 to reference point A. After initial deformation of the connecting rod 304, the convex outer surface 326 may contact the inner diameter surface 324 of the bore 312 from the bisecting plane 310 to reference point B. After further deformation, the convex outer surface 326 may contact the inner diameter surface 324 of the bore 312 from the bisecting plane 310 to reference point C.

At block 506, the connecting rod 104 may fracture at, for example, the bisecting plane 110, thus producing the separate bearing cap 101 and the remaining portion of the connecting rod 104. In particular, the connecting rod 104 fractures without deforming side portions of the bore radially inward, and thus maintaining a circular bore within which the eccentric pin of the crankshaft may be mounted.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A mandrel, comprising:
a pair of jaw elements slidably mounted relative to one another and separated from each other;
wherein each one of the pair of jaw elements has a pair of opposing side portions and a center portion disposed between the opposing side portions;
wherein each one of the side portions has a convex outer surface with a radius of curvature equal to a radius of the inner diameter surface of the bore and is configured to contact an inner diameter surface of a bore of a connecting rod when the pair of jaw elements are moved away from one another within the bore so as to break the connecting rod;
wherein each center portion is configured to be spaced apart from the inner diameter surface of the bore when the pair of jaw elements are moved away from one another within the bore, such that the opposing side portions contact the connecting rod bore; and
wherein each center portion has a convex outer surface that has a radius of curvature greater than the radius of curvature of each one of the side portions to progressively increase contact with the inner diameter surface of the bore as the pair of jaw elements are moved away from one another.

2. The mandrel as recited in claim 1 wherein each center portion includes a planar outer surface extending between the opposing side portions.

3. The mandrel as recited in claim 2 wherein the jaw elements are separated from one another along a bisecting plane that extends through a central axis of the connecting rod bore, and the planar outer surface is disposed parallel to the bisecting plane.

4. The mandrel as recited in claim 1 wherein each one of the jaw elements has a semi-circular outer surface and each center portion is a recess formed in the semi-circular outer surface.

5. The mandrel as recited in claim 4 wherein the recess forms up to 90 degrees of the semi-circular outer surface.

6. A system for cracking a connecting rod, comprising:
a pair of jaw elements slidably mounted relative to one another and separated from each other; and
a frame carrying the pair of jaw elements;
wherein each one of the pair of jaw elements has a pair of opposing side portions and a center portion disposed between the opposing side portions;
wherein each one of the side portions has a convex outer surface with a radius of curvature equal to a radius of the inner diameter surface of the bore and is configured to contact an inner diameter surface of the bore of the connecting rod when the pair of jaw elements are moved away from one another within the bore so as to break the connecting rod;
wherein each center portion is configured to be spaced apart from the inner diameter surface of the bore when the pair of jaw elements are moved away from one another within the bore, such that the opposing side portions contact the connecting rod bore; and
wherein each center portion has a convex outer surface that has a radius of curvature greater than the radius of curvature of each one of the side portions to progressively increase contact with the inner diameter surface of the bore as the pair of jaw elements are moved away from one another.

7. The system as recited in claim 6 further comprising a motor configured to move at least one of the jaw elements apart from the other of the jaw elements.

8. The system as recited in claim 6 further comprising a fixture device configured to hold the connecting rod when the mandrel breaks the connecting rod.

9. The system as recited in claim 6 wherein each one of the pair of jaw elements has a semi-circular outer surface and the center portion is a recess formed in the semi-circular outer surface.

10. A process for operating a mandrel to break a connecting rod, comprising:
inserting a mandrel having a pair of opposing jaw elements into a bore of the connecting rod;
abutting a pair of opposing side portions of at least one of the jaw elements against an inner diameter surface of the bore, wherein each one of the side portions has a convex outer surface with a radius of curvature equal to a radius of the inner diameter surface of the bore; and spacing apart a center portion of the jaw elements from the inner diameter surface of the bore while the opposing side portions are in contact with the connecting rod bore, the center portion having a radius of curvature greater than the radius of curvature of each one of the side portions;

progressively abutting an increasing amount of the center portion of each of the pair of jaw elements against the inner diameter surface of the bore while the center portion of the jaw elements remains spaced away from the inner diameter surface of the bore.

11. The process as recited in claim 10, further comprising: actuating a motor to move the jaw elements apart from each other along a longitudinal axis of the connecting rod.

* * * * *